though hydrates of chromium fluoride be employed.

United States Patent Office 2,745,867
Patented May 15, 1956

2,745,867

FLUORINATION OF PERHALOACETONITRILES OVER AN IMPROVED CHROMIUM FLUORIDE CATALYST

Robert P. Ruh and Ralph A. Davis, Midland, Mich., assignors to The Dow Chemical Company, Midland, Mich., a corporation of Delaware No Drawing. Application January 31, 1955,
Serial No. 485,307

8 Claims. (Cl. 260—465.7)

This invention relates to a process for fluorinating perhaloacetonitriles with the acid of an improved chromium fluoride catalyst.

Heretofore, it has been known that chromium fluoride is useful in promoting the vapor-phase fluorination reaction of hydrogen fluoride with certain haloalkanes at elevated temperatures above 350° C. In U. S. Patent 2,110,369, Leicester discloses that chromic fluoride supported on carbon in a massive or granular form is a suitable catalyst. More recently, Benning et al. in U. S. Patent 2,158,551 have found that $CrF_3$ supported on activated carbon, or pellets of $CrF_3$ per se, will catalyze the reaction of HF with $CCl_4$ to form $CF_4$, but only at a relatively high temperature in the range of from 700° C. to about 1000° C. While the catalysts set forth in the above patents have been recommended broadly for the reaction of halomethanes and hydrogen fluoride, they are effective mainly in inducing the fluorination of chloromethanes to products containing a low degree of fluorine substitution.

In our co-pending application, Serial No. 485,306, filed January 31, 1955, it has been disclosed that an improved catalyst, believed to be a basic chromium fluoride catalyst, can be prepared by heating a hydrated chromium fluoride to a temperature in the range of about 350° C. to about 750° C. in the presence of oxygen, and that the catalyst so prepared is more effective in directing the course of the vapor-phase fluorination of haloalkanes to greater conversions and yields of more highly fluorinated products, and at much lower temperature, than has heretofore been achieved with $CrF_3$, or with any of the catalysts known in the literature.

The present invention is based on the further discovery of a new process for fluorinating certain perhaloacetonitriles over the novel basic chromium fluoride catalyst mentioned briefly in the preceding paragraph and hereinafter described in greater detail. In carrying out the fluorination process of the invention, the perhaloacetonitrile is vaporized and passed together with hydrogen fluoride through a heated bed of the catalyst at a temperature in the range of from about 300° C. to 600° C. Those perhaloacetonitriles which can be fluorinated in accordance with the instant process have the following general formula:

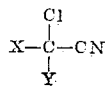

wherein X and Y each represent a member of the group consisting of chlorine and fluorine. Perhaloacetonitriles corresponding to this formula are trichloroacetonitrile, dichlorofluoroacetonitrile, and chlorodifluoroacetonitrile, the latter two compounds being obtained as incompletely fluorinated products of the former.

As previously stated, the instant process can be conducted at reaction temperatures in the range of from about 300° to 600° C. For best results, however, it is usually desirable to employ reaction temperatures above 400° C., preferably between 400° C. and about 500° C. The choice of temperature is dependent not only upon the reactivity of the perhaloacetonitrile which is to be reacted with hydrogen fluoride, but also upon the products desired, the contact time, and other factors. In general, the optimum temperature varies inversely as contact time and directly with the degree of fluorination. That is to say, the temperature may be reduced slightly as contact time is increased; conversely, the higher the desired degree of fluorination of the perhaloacetonitrile, the higher the temperature required. For instance, higher temperatures are required to convert $Cl_3C$—CN to $F_3C$—CN and to $F_2ClC$—CN than to $FCl_2C$—CN. The optimum temperature of fluorination also depends upon the activity of the catalyst which in turn depends partly upon its method of preparation, and partly upon its condition due to prolonged use, e. g. carbon surface coatings and the like.

The ratio of hydrogen fluoride to perhaloacetonitrile to be employed in the fluorination reaction will, of course, depend upon the product desired, there being used at least one mole of hydrogen fluoride per mole of the organic reactant. For making a maximum of any given fluoroacetonitrile product, HF should be present in an amount at least equal to, and preferably in excess of, the amount stoichiometrically required for producing that product. For instance, in converting $Cl_3C$—CN to $FCl_2C$—CN, a stoichiometric amount of HF equal to one mole of HF per mole of $Cl_3C$—CN is required. In fluorinating $Cl_3C$—CN to $F_3C$—CN, however, a stoichiometric quantity of HF calls for 3 moles of HF per mole of $Cl_3C$—CN. Ordinarily, from about 10 percent to 300 percent in excess of a stoichiometric proportion of HF is employed for high conversions and yields of the desired product.

Contact times of from about 1 to 20 or more seconds may be used in the fluorination process, although from 1 to 10 seconds are usually preferred. Contact times longer than 20 seconds are not to be desired and result in low throughput and product yields. A contact time of less than 1 second usually results in insufficient conversion which necessitates recycling.

The fluorination reaction is generally carried out at a pressure slightly above atmospheric although both subatmospheric and superatmospheric pressures are operable. Aside from greater capacity per unit volume of catalyst, higher pressures are sometimes preferred to give more highly fluorinated compounds. For this purpose, pressures of from 10 to 200 pounds per square inch gauge are employed.

The products of the reaction may be separated into their component parts by known procedures, e. g. by a series of fractional distillations, water and aqueous sodium hydroxide washes, drying steps, and the like.

As previously indicated, the new and improved catalyst of the invention may be prepared by heating a hydrated chromium fluoride to a temperature in the range of from about 350° C. to 750° C. in the presence of oxygen. By such treatment, the hydrated chromium fluoride is at least partially converted to a basic chromium fluoride as hereinafter described. It is essential that a hydrated chromium fluoride be employed since it has been shown experimentally that the improved catalytic compositions of the invention cannot be prepared from anhydrous chromium fluoride, $CrF_3$. Likewise, the catalytic activity of $CrF_3$ cannot be increased by heating to a temperature of from 350° C. to 750° C. in the presence of oxygen.

Ordinarily the trihydrate of chromium fluoride, $CrF_3.3H_2O$, is initially employed to prepare the novel catalyst of the invention, although any of the higher hydrates may satisfactorily be used, such as the hemiheptihydrate, $CrF_3 \cdot 3\frac{1}{2}H_2O$; the tetrahydrate, $CrF_3 \cdot 4H_2O$; the hexahydrate, $CrF_3 \cdot 6H_2O$; the enneahydrate, $$CrF_3 \cdot 9H_2O$$

and the like. It is the chromium fluoride trihydrate, though, which is preferred both from the standpoint of ease of preparation, e. g. availability, and ease of handling. Regardless of which of the higher hydrates is initially employed, all lose water of hydration upon heating and become the trihydrate prior to or during the early stages of the activation process. The preferred chromium fluoride hydrate used to prepare the catalyst of the invention is obtained by first reacting chromium trioxide ($CrO_3$) with excess strong aqueous hydrofluoric acid in the presence of oxidizable organic matter, and thereafter heating the resultant reaction product to sensible dryness. A sufficient amount of oxidizable organic material should be employed in the chromium trioxide-hydrofluoric acid reaction to reduce substantially all of the chromium to the trivalent state, substances such as formaldehyde, toluene, xylene, sugar, polyethylene, and the like being satisfactory for this purpose. Ordinarily hydrofluoric acid of about 50 to 70 weight percent strength is added to the solid chromium trioxide to slurry it, the addition of hydrofluoric acid being continued until all of the chromium trioxide is dissolved. When the dissolution is carried out in a metal container, e. g. of a magnesium metal alloy, little if any reaction occurs between the hydrofluoric acid and the chromium trioxide until the oxidizable organic compound, e. g. sugar, is added. When the dissolution is conducted in a polyethylene vessel, however, enough of the polyethylene is attacked to effect the desired reaction. Upon conducting the reaction to completion and cooling the reaction product, a bright green semi-solid mass is obtained which is heated to sensible dryness, e. g. at a temperature of from 90° to 110° C. The product so dried appears by X-ray diffraction and other analyses to consist preponderantly of alpha chromic fluoride trihydrate, $\alpha$-$CrF_3 \cdot 3H_2O$. This material may, if desired, be broken or ground into fragments or granules and activated by heating in a stream of oxygen or air as hereinafter particularly described. Usually the sensibly dry hydrate is coarsely ground, e. g. to pass through a 10 mesh screen, the graphite is admixed therewith in an amount equal to about 2 percent by weight, and the resultant mixture pelleted. It is these pellets which are then activated. Alternatively, the hydrated chromium fluoride may be slurried with water and pasted on a carrier, such as activated charcoal or magnesium fluoride gel, and then activated, or heated to sensible dryness and then activated.

As hereinbefore stated, the novel basic chromium fluoride catalyst of the invention is prepared by heating a hydrated chromium fluoride, e. g. $CrF_3 \cdot 3H_2O$, in the presence of oxygen at a temperature in the range of from about 350° C. to 750° C. When a carbonaceous material, such as graphite, is used to prepare pellets of the hydrated chromium fluoride, it is generally desirable to carry out the activation at a sufficiently high temperature to burn off the carbon. An activation temperature in the range of from about 500° to about 600° or 650° C. is satisfactory for oxidizing carbon and is generally preferred for preparing a catalyst having maximum activity. It is also advantageous to heat the chromium fluoride rapidly to the temperature at which it becomes activated, e. g. above 350° C. when a highly active catalyst is desired. Prolonged preliminary heating at lower temperatures, e. g. at about 200° C., should be avoided since such treatment usually produces a catalyst of lower activity containing substantial amounts of catalytically inactive $Cr_2O_3$.

By activation in the presence of oxygen is meant activation (1) with substantially pure oxygen gas, (2) with a gas containing molecular oxygen, or (3) with a compound which liberates or releases oxygen under activation conditions, e. g. $CrO_3$. Activation is usually accomplished by passing a stream of a gas comprising molecular oxygen, such as oxygen or an oxygen-containing gas, e. g. air, through a heated bed of the hydrated chromium fluoride. The initial moisture content of the activating gas stream does not appear to have any effect on the activity of the resultant catalyst. Activation in a stream of oxygen, however, ordinarily produces a catalyst which is catalytically active at a lower temperature than a catalyst prepared in a stream of air. Alternatively, the hydrated chromium fluoride may be activated upon first admixing it with a small but effective amount of a substance, e. g. chromium trioxide ($CrO_3$), which will decompose to liberate oxygen at a temperature within the range of about 350° to 750° C., and thereafter heating the mixture, preferably after pelletization, to a temperature at or above which said substance decomposes to liberat oxygen. A mixture of $CrF_3 \cdot 3H_2O$ and $CrO_3$, the latter being present in a minor proportion up to about 50 percent by weight, is desirably pelletized with graphite and then activated by heating at a temperature above about 420° C., the temperature at which $CrO_3$ decomposes to liberate oxygen. No oxygen other than that liberated by the thermal decomposition of $CrO_3$ is necessary for the activation step. Chromic oxide, viz. $Cr_2O_3$, does not decompose to liberate oxygen upon heating and therefore does not aid in the activation of hydrated chromium fluorides in accordance with the method of the invention. In fact, a catalyst prepared by heating pellets of a mixture of $CrF_3 \cdot 3H_2O$ and $Cr_2O_3$ at about 550° C. is catalytically less active than $CrF_3$ per se. Furthermore, the presence of $Cr_2O_3$ in substantial amounts appears to affect adversely the catalytic activity of the basic chromium fluoride catalyst of the invention.

Heating in the presence of oxygen should be carried out for a time sufficiently long to convert at least partially some of the hydrated chromium fluoride to basic chromium fluoride, the final catalyst containing at least 0.1 percent by weight and preferably from 1 to 20 or more percent by weight of this substance. In general, activation is substantially complete after heating at an activation temperature in the presence of oxygen for a period of $\frac{1}{2}$ to 2 hours, although heating may be prolonged for as long as 20 hours or more without adversely affecting the catalytic activity.

Following activation of the catalyst by heating in the presence of oxygen, it is usually desirable, but not essentail, to pass anhydrous hydrogen fluoride over the catalyst for a short time prior to using it in a fluorination reaction. This step is carried out as a precautionary measure, i. e. to purge any residual oxygen gas from the reaction vessel before introducing the halohydrocarbon, and does not appear to affect the activity of the catalyst. However, passing a perhaloacetonitrile over the heated catalyst in the absence of hydrogen fluoride quickly reduces the activity of the catalyst. Such a catalyst of lowered activity, as well as one which has lost part of its atcivity through prolonged use due to carbon deposition, can easily be reactivated by burn off in a stream of air. During reactivation, as well as during the initial activation step itself, a small amount of chromic trioxide, $CrO_3$, is usually present in the vent gas stream.

The highly active catalyst of the invention consists essentially of one or more basic chromium fluorides, viz. chromium hydroxy- (or oxy-) fluorides. This catalyst is amorphous to X-ray diffraction analyses, i. e. no crystals could be detected by a method capable of distinguishing crystallites 100 angstroms or larger in size. Some crystalline hydroxy fluorides whose compositions fall within the range $CrF(OH)_2$ to $CrF_2(OH)$, commonly written $Cr(OH,F)_3$, have at times been found to be present as impurities in small proportions.

Preparing the catalyst of the invention, as well as conducting the fluorination reaction itself, may be accomplished in a tube made of, or lined with, any suitable material such as Monel, Inconel, nickel, silver, or platinum.

After prolonged use, carbon deposits are slowly built up on the catalyst, the rate of carbon deposition being affected by several factors, such as reactant ratio, residence time in the reactor, and temperature. Such a carbon-containing catalyst of lowered activity may be regenerated as aforesaid by passing a stream of oxygen or oxygen-containing gas over it at a temperature of about 500° C. Heating in the presence of oxygen is continued until carbon dioxide is no longer detected in the vent gas. A stream of anhydrous hydrogen fluoride may then be passed over the catalyst to saturate it with HF prior to another fluorination run.

The examples that follow illustrate but do not limit the invention.

Example 1

The vapor-phase fluorination reaction of trichloroacetonitrile with anhydrous hydrogen fluoride was carried out over a pelleted basic chromium fluoride catalyst of the invention as hereinafter described.

The catalyst was prepared from a commercial grade high purity $CrF_3 \cdot 3H_2O$ which was first admixed with 2 percent by weight of graphite and then pressed into disc-shaped pellets 3/16 inch thick by 3/16 inch in diameter. These were loaded into a vertical nickel reaction tube three quarters of an inch inside diameter. A stream of air was then passed upwardly through the bed of pellets at a rate of from 0.2 to 0.3 liter per minute and the pellets were rapidly heated to a temperature of about 500° C. in a period of about 30 minutes by means of an electric furnace surrounding the reaction tube. The aforesaid flow of air and temperature were held constant for about 2 hours, the temperature being measured and controlled by means of a thermocouple located between the furnace and the reaction tube near the top, i. e. exit end, of the bed of pellets. Following activation with air, anhydrous hydrogen fluoride gas was passed through the reaction tube for abut 30 minutes.

The catalyst so prepared was a grey green, water insoluble solid which was found by chemical analysis to correspond approximately to the empirical formula $CrO_3F_2$. When examined by X-ray diffraction analysis, it was found to be amorphous, i. e. no crystals could be detected by a method capable of distinguishing crystallites 100 angstroms or larger in size. No anhydrous chromium fluoride, $CrF_3$, was observed by X-ray diffraction.

The following run was carried out at a temperature of 450° C. by passing a vapor-phase mixture of HF and $Cl_3C$—CN upwardly through a bed of the above-described catalyst loaded to a height of 22 inches in a vertical nickel reaction tube three-quarters of an inch inside diameter. The vapor-phase reactant mixture fed to the reaction tube was formed by bubbling anhydrous hydrogen fluoride gas upwardly through liquefied trichloroacetonitrile contained in a heated nickel vaporizer. The amount of trichloroacetonitrile picked up by the hydrogen fluoride gas, i. e. the ratio of hydrogen fluoride to trifluoroacetonitrile, was controlled by regulating the temperature of the liquefied $Cl_3C$—CN in the vaporizer. During a period of 307 minutes, approximately 685 grams (4.73 moles) of $Cl_3C$—CN and 436 grams (21.8 moles) of HF were put through the reactor. This represents a mole ratio of HF to $CCl_3C$—CN of 4.6 and a contact time of 1.7 seconds.

The effluent stream from the reactor was scrubbed with ice-cold water in a polyethylene vessel so as to remove the acidic constituents, viz. HCl and HF, and to condense the higher boiling constituents. Thereafter the water-scrubbed gas stream was passed into refrigerated traps cooled in a dry-ice acetone mixture to condense the lower boiling components. The scrubber-water was titrated with standard sodium hydroxide and silver nitrate solutions, and the total organic product weighing 530 grams was separated to its component parts by low temperature fractional distillation in a Podbielniak column. From these data, the mole precent recovery, based on the trichloroacetonitrile charged, was calculated for each component of the organic product. There were obtained 16.0 grams of $F_3C$—CN, 270 grams of $F_2ClC$—CN, 197 grams of $FCl_2C$—CN, 33.0 grams of $Cl_3C$—CN, and 8.7 grams of $CF_3Cl$. Based on the $Cl_3C$—CN charged, these data correspond to the following mole precent recoveries:

| | Mole percent |
|---|---|
| $F_3C$—CN | 3.6 |
| $F_2ClC$—CN | 51.2 |
| $FCl_2C$—CN | 32.6 |
| $Cl_3C$—CN | 4.9 |
| $CF_3Cl$ | 1.7 |

The compounds $FCl_2C$—CN and $F_2ClC$—CN were identified by mass spectrometry and other analyses. Dichlorofluoroacetonitrile is a water-white liquid having a boiling point of 32.3° C. at 738 millimeters of mercury absolute, a freezing point of −110.1° C., a density of 1.3909 at 25° C., and a refractive index n/D of 1.3682 at 20° C. Chlorodifluoroacetonitrile is normally a gas. Upon liquefication, it was found to have a boiling point of about −17° C. at about 740 millimeters of mercury absolute, a freezing point of −148.0° C., and a density of 1.1808 at 25° C. as determined under pressure in a sealed ampule. Both $FCl_2C$—CN and $F_2ClC$—CN were tested and found to be effective ovicides against the eggs of the confused flour beetle.

Example 2

To demonstrate that substantial amounts of $F_3C$—CN can be produced by the vapor-phase fluorination of $Cl_3C$—CN in accordance with the process of the invention, the following run was carried out over the same catalyst in the same nickel reaction tube and according to the same general procedure employed in Example 1. The reaction was conducted at a temperature of 450° C. while passing HF and $Cl_3C$—CN over the catalyst in a mole reactant ratio of 9.0 and at a contact time of 8.6 seconds. Throughout the run of 260 minutes, 61 grams of $Cl_3C$—CN and 76 grams of HF were fed to the reactor. The organic product weighing 56 grams was fractionally distilled into its component parts. Based on the organic recovery, the yield of fluoroacetonitrile compounds was 96 mole percent as follows:

| | Mole percent |
|---|---|
| $F_3C$—CN | 26.4 |
| $F_2ClC$—CN | 66.5 |
| $FCl_2C$—CN | 3.1 |

Example 3

The fluorination of dichlorofluoroacetonitrile was carried out by passing a vapor-phase mixture of HF and $FCl_2C$—CN upwardly through a vertical nickel reaction tube containing a 2 inch by 24 inch bed of catalyst prepared as described in Example 1. The fluorination reaction was conducted at a temperature of 500° C. for a period of 635 minutes. During this time a total of 12,531 grams of $FCl_2C$—CN and 5156 grams of HF were passed through the reactor. This represents a molar reactant ratio of 2.6 and a contact time of 3.1 seconds. Upon separating the organic product by fractional distillation, an organic recovery (based on the $FCl_2C$—CN charged) of approximately 84 percent was obtained as follows:

| | Mole percent |
|---|---|
| $F_2ClC$—CN | 74.2 |
| $FCl_2C$—CN | 9.8 |

Example 4

The fluorination of chlorodifluoroacetonitrile was conducted in accordance with the preceding examples over a 2 inch by 24 inch bed of catalyst prepared as described in Example 1. Throughout the run of 180 minutes, 144 grams of $F_2ClC$—CN and 350 grams of HF were passed through the catalyst bed maintained at a temperature of approximately 525° C. The organic product was separated by fractional distillation. Based on the $F_2ClC$—CN charged, approximately 42 mole percent was converted to $F_3C$—CN.

This application is a continuation-in-part of our prior application Serial No. 377,688, filed August 31, 1953.

That which is claimed is:

1. The process of fluorinating a perhaloacetonitrile corresponding to the general formula

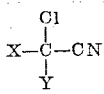

wherein X and Y each represent a member of the group consisting of chlorine and fluorine, which process comprises passing the perhaloacetonitrile and greater than one molecular proportion of hydrogen fluoride at a reaction temperature in the range of from 300° to 600° C. through a bed of a catalyst prepared by heating a hydrated chromium fluoride to a temperature in the range of from about 350° to 750° C. in the presence of oxygen.

2. The process according to claim 1 wherein the perhaloacetonitrile is trichloroacetonitrile.

3. The process according to claim 1 wherein the perhaloacetonitrile is dichlorofluoroacetonitrile.

4. The process according to claim 1 wherein the perhaloacetonitrile is chlorodifluoroacetonitrile.

5. The process of fluorinating a perhaloacetonitrile corresponding to the general formula

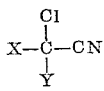

wherein X and Y each represent a member of the group consisting of chlorine and fluorine, which process comprises passing the perhaloacetonitrile and greater than one molecular proportion of hydrogen fluoride at a reaction temperature in the range of 300° to 600° C. through a bed of a catalyst prepared by heating a mixture of a major proportion of hydrated chromium fluoride and a minor proportion of chromium trioxide at a temperature above about 400° C. for a time sufficiently long to convert at least part of the hydrated chromium fluoride to a basic chromium fluoride.

6. The process of fluorinating a perhaloacetonitrile corresponding to the general formula

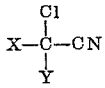

wherein X and Y each represent a member of the group consisting of chlorine and fluorine, which process comprises passing the perhaloacetonitrile and at least a stoichiometric proportion of hydrogen fluoride at a reaction temperature in the range of from 300° to 600° C. through a bed of a catalyst prepared by heating $CrF_3.3H_2O$ to a temperature in the range of from 350° C. to about 650° C. while passing a stream of a gas comprising molecular oxygen therethrough.

7. The process of preparing chlorodifluoroacetonitrile over a fluorination catalyst obtained by heating alpha chromium fluoride trihydrate to a temperature in the range of from 350° C. to 650° C. while passing a stream of air therethrough, which process comprises passing trichloroacetonitrile and at least twice the stoichiometric proportion of hydrogen fluoride into contact with said fluorination catalyst for a time of from about 1 to 20 seconds at a temperature in the range of from 400° to 600° C. and thereafter separating chlorodifluoroacetonitrile therefrom.

8. The process of fluorinating trichloroacetonitrile over a basic chromium fluoride catalyst consisting essentially of particles of less than 100 angstrom units in size having been prepared by heating a hydrated chromium fluoride to a temperature in the range of from 350° to 650° C. in a stream of air, which fluorination process comprises passing trichloroacetonitrile and at least a stoichiometric proportion of hydrogen fluoride through a heated bed of said fluorination catalyst at a reaction temperature in the range of from 300° to 600° C.

No references cited.